US006990515B2

(12) United States Patent
Cromer et al.

(10) Patent No.: US 6,990,515 B2
(45) Date of Patent: Jan. 24, 2006

(54) SECURE METHOD AND SYSTEM TO PREVENT INTERNAL UNAUTHORIZED REMOTELY INITIATED POWER UP EVENTS IN COMPUTER SYSTEMS

(75) Inventors: Daryl Carvis Cromer, Apex, NC (US); Joseph Wayne Freeman, Raleigh, NC (US); Chad Lee Gettelfinger, Durham, NC (US); Steven Dale Goodman, Raleigh, NC (US); Eric Richard Kern, Durham, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/135,010

(22) Filed: Apr. 29, 2002

(65) Prior Publication Data

US 2003/0204746 A1 Oct. 30, 2003

(51) Int. Cl.
*G06F 1/26* (2006.01)
*G06F 15/173* (2006.01)

(52) U.S. Cl. ....................... 709/208; 709/225; 713/310

(58) Field of Classification Search ................ 709/208, 709/225, 229; 713/310
See application file for complete search history.

(56) References Cited

U.S. PATENT DOCUMENTS 4,922,450 A 5/1990 Rose et al.
5,809,253 A 9/1998 Gallagher et al.
5,835,719 A 11/1998 Gibson et al.
5,983,353 A * 11/1999 McHann, Jr. ............... 713/310
5,991,887 A 11/1999 Ezell
6,021,493 A * 2/2000 Cromer et al. .............. 709/224
6,047,378 A 4/2000 Garrett et al.
6,049,885 A 4/2000 Gibson et al.
6,101,608 A 8/2000 Schmidt et al.

(Continued)

FOREIGN PATENT DOCUMENTS

JP 7079249 3/1995

OTHER PUBLICATIONS

D. Cromer, D. Desai, B. Gould, R. Johnson, R.D. Johnson, H. Locker and D. Rhoades, Definition of a Global Wake on Local Area Network Frame, IBM Technical Disclosure Bulletin, Dec. 1996, pp. 41-42, vol. 39, No. 12.

*Primary Examiner*—Patrice Winder
(74) *Attorney, Agent, or Firm*—J. Bruce Schelkopf; Dillon & Yudell LLP

(57) ABSTRACT

In a computer network including a plurality of interconnected computers, one of the computers being a sleeping computer in a power down state, the sleeping computer listening for a packet associated with the sleeping computer, a method of waking the sleeping computer from the computer network. An incoming packet of data is transmitted from an administration system in the network to the sleeping computer. When the sleeping computer detects the incoming packet, it determines if the incoming packet contains a data sequence associated with the sleeping computer. If the incoming packet matches the particular data sequence associated with the sleeping computer, the sleeping computer transmits a reply message to the administration system. Upon receiving the reply, the administration system modifies the reply message in a predetermined manner and transmits the modified reply to the sleeping computer. If the sleeping computer determines the reply message was modified in the predetermined manner, then a signal is issued to wake the sleeping computer. Otherwise, the incoming packet is discarded and the sleeping computer is not awakened.

8 Claims, 3 Drawing Sheets

U.S. PATENT DOCUMENTS

| | | | | |
|---|---|---|---|---|
| 6,134,668 | A | 10/2000 | Sheikh et al. | |
| 6,202,160 | B1 | 3/2001 | Sheikh et al. | |
| 6,243,589 | B1 | 6/2001 | Novel | |
| 6,286,111 | B1 | 9/2001 | Snover | |
| 6,366,957 | B1 * | 4/2002 | Na | 709/229 |
| 6,493,824 | B1 * | 12/2002 | Novoa et al. | 709/208 |
| 6,526,507 | B1 * | 2/2003 | Cromer et al. | 713/162 |
| 6,606,709 | B1 * | 8/2003 | Connery et al. | 713/178 |
| 2003/0002676 | A1 * | 1/2003 | Stachura et al. | 709/229 |

* cited by examiner

SECURE METHOD AND SYSTEM TO PREVENT INTERNAL UNAUTHORIZED REMOTELY INITIATED POWER UP EVENTS IN COMPUTER SYSTEMS

BACKGROUND OF THE INVENTION

1. Technical Field

This invention relates generally to network computing systems, more particularly, to an improved method and system for remotely waking a computer from a network, and still more particularly to an improved method and system for remotely waking a computer from a network wherein the likelihood of an unauthorized remotely initiated wake up is diminished.

2. Description of the Related Art

Computer networks are commonly used in offices or corporate environments to interconnect personal computers. Well-known local area networks (LANs), such as Ethernet, Token Ring and ARCnet, are widely used to connect a group of computers and other devices that are dispersed over a relatively limited area, such as an office or building, and new LANs continue to be developed. These local area networks provide an efficient and economical way for personal computers to share information and peripherals.

Of course, computer networks are not limited to the confines of an office or building. Smaller networks are commonly interconnected into wide area networks (WANs), such as the Internet, to provide a communications link over a larger area. The Internet is actually a collection of networks that share the same namespace and use the TCP/IP protocols. Originally developed for the military in 1969, the Internet now connects over four hundred networks and tens of thousands of nodes in over forty-two countries. It is estimated that the Internet is now accessed by more than 10 million people every day, and that perhaps as many as 513 million people have access to the Internet.

As is well known in the art, the transmission of data packets across networks is governed by a set of rules called "transport protocols." In order for two computers in a local area network to communicate with one another, each computer must use the proper transport protocol for the particular network. During the last decade, many different transport protocols have evolved for different networks. For example, TCP/IP is the transport protocol widely used in UNIX-based networks and with Ethernet 802.3 LANs; IPX/SPX is the transport protocol used by Novell Corporation's NetWare software; NetBEUI is the local-area transport protocol developed by IBM to operate underneath Microsoft's NetBIOS network interface; DECnet is the transport protocol used by Digital Equipment Corporation for linking computer systems to DECnet-based networks; AppleTalk is the transport protocol developed by Apple Computer, Inc. for linking computer systems to Apple Macintosh network systems; and XNS is the transport protocol developed by Xerox Corporation that was used in early Ethernet networks. These transport protocols, which are all well known in the art, are often implemented as drivers which can be loaded into and removed from a computer system.

In order to connect to a network, a computer is usually provided with one or more network interface cards that provide a data link to the network. Each network interface card has a unique address, referred to herein as its "destination address," which enables each computer to be individually addressed by any other computer in the network. The destination address is typically, but not always, a 12 digit hexadecimal number (e.g., 00AA00123456) that is programmed into non-volatile memory located on the network interface card and is generally hidden from the user's view.

The destination address of a computer is analogous to a person's social security number in that, although every person in the country is assigned a unique social security number, it is generally not known to other people and rarely used in normal communications. Likewise, the destination address of a computer is a more primitive means of identifying the computer, and users are not expected to know and remember the destination address of every computer in the network. Instead, every computer generally has a computer name (commonly corresponding to the user's name and/or machine location) that is more widely known. When a user desires to send a message to another computer, the transport protocol in the network is responsible for converting the computer name into the corresponding destination address to facilitate communicating between the two computers.

The network interface card of the destination computer is designed to continually monitor incoming packets over the network. When the network interface card detects an incoming packet containing its destination address, the network interface card will identify itself as the intended recipient of the packet.

In full power mode communications transmissions occur between two computers automatically and completely invisible to the user. However, efforts are now being made to extend the use of network computing to power management applications, in which one or more of the computers may be operating in a low power mode. In particular, there is increasing demand for power management systems that minimize the energy consumption of computer systems, yet still allow the possibility for receiving remote communications from other computers via a network. These power management systems must provide a mechanism for "waking" a remote computer system from the network in order to receive the communications.

Generally stated, "power management" refers to a computer system's ability to conserve or otherwise manage the power that it consumes. Although power management concerns were originally focused on battery-powered portable computers, these concerns now extend to AC-powered "desktop" computer systems as well. For example, the United States government now provides strong incentives to those in the computer industry to promote energy efficiency in computers.

More particularly, power management refers to the ability to dynamically power down a computer or certain devices when they are not in use, thereby conserving energy. A computer in this condition is referred to herein as being in a "power down" state or condition. Power is then restored to the computer or devices when they are required for use. This process is often referred to as "waking" the computer.

A computer in a power down state may be in a "suspended power state" or a "hibernated power state." In general, a computer in a suspended power state is similar to a computer with all power removed, except that power to memory is maintained and dynamic RAM (DRAM) is refreshed. In addition, the operations of the computer are held in a suspended power state for a suspend operation, whereas the system loses its current operational state on a general power down.

A computer in a hibernated power state is similar to the suspended power state, except that the memory states are written to disk and the entire computer system is shut down.

Although there are several existing power management systems, most are not designed to operate in a network computing environment. Further, those that are designed to operate in a network are limited in their usefulness. For example, in one prior system for waking a computer from a local area network, a remote wake frame or "magic packet" is defined that includes the destination address repeated 16 times somewhere within the packet. While the computer is in the power down state, its network interface card continually monitors all incoming message packets for one that has its destination address repeated 16 times. When the network interface card detects an incoming packet with this address sequence, the network interface card transmits a signal to the operating system to wake the computer.

A significant limitation with this system is that it provides little, if any, security. Anyone with access to the network may send a packet to wake sleeping systems, permitting nuisance attacks where an unauthorized computer wakes systems needlessly on the network.

Attempts to solve the security issues associated with waking a remote computer have focused on using passwords in the magic packet. However, passwords only provide limited protection. Once discovered the password may be used by any computer on the network. An unauthorized system may uncover the password by any number of means, including "brute force" or "sniffing." Brute force password discovery is defined as trying all possibilities until the password is found. Sniffing refers to a machine listening for all packets on the network, including those addressed to other machines. If the sniffed packet is determined to be a magic packet the password is extracted.

Therefore, there is a need for an improved method and system of waking a remote computer on a network where the likelihood of an unauthorized remotely initiated wake up is diminished.

SUMMARY OF THE INVENTION

As will be seen, the foregoing invention satisfies the foregoing needs and accomplishes additional objectives. Briefly described, the present invention provides an improved method and system for remotely waking a client system from a network. In contrast to previous systems, the method and system of the present invention diminishes the likelihood of an unauthorized remotely initiated wake up.

According to one aspect of the present invention, a method and system of waking a client system that is in a power down state (the "sleeping computer") from a computer network is provided. The sleeping computer includes a network interface card that listens for a particular data sequence. The method and system begin when an incoming data packet is transmitted from an administration system in the computer network to the sleeping computer. When the network interface card detects the incoming packet, it searches the incoming packet for the particular data sequence associated with the sleeping computer. If the incoming packet contains the particular data sequence associated with the sleeping computer, the sleeping computer transmits a reply message to the administration system. Upon receiving the reply, the administration system modifies the reply message in a predetermine manner and transmits the modified reply to the sleeping computer. If the sleeping computer determines the reply message was modified in the predetermined manner, then a signal is issued to wake the sleeping computer. Otherwise, the incoming packet is discarded and the sleeping computer is not awakened.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
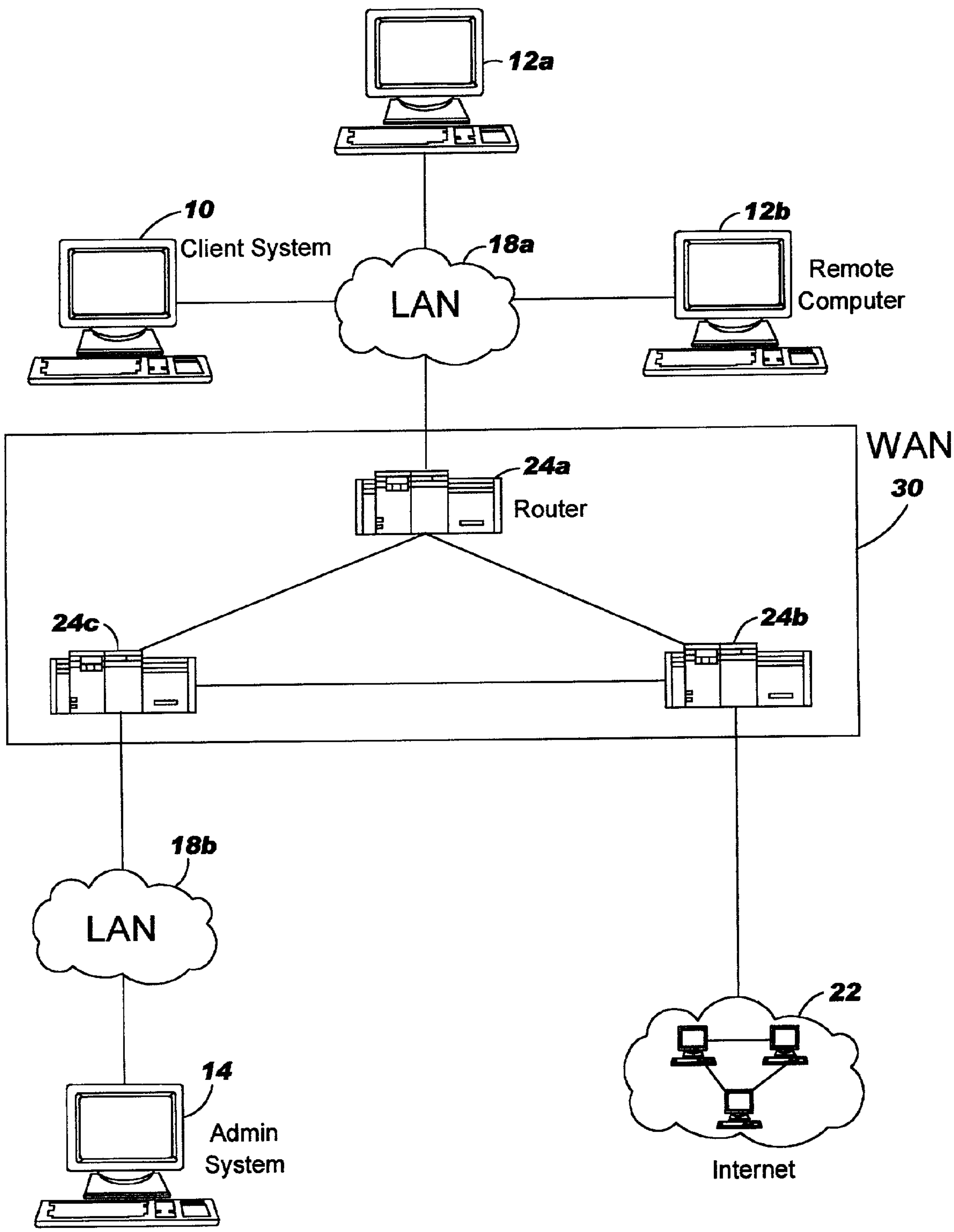
FIG. 1 is a schematic diagram illustrating a network of computers within which the present invention may find application.

Referring now to the drawing figures, in which like numerals indicate like elements or steps throughout the several views, the preferred embodiment of the present invention will be described. In general, the present invention provides an improved method and system for waking a client system from a network. In contrast to previous systems, the present invention described herein diminishes the likelihood of an unauthorized remotely initiated wake up.

FIG. 1 illustrates a schematic diagram of the typical application of the present invention, a client system 10 and an administration system 14 embodying the system of the present invention, and which execute the steps and methods described herein. As show in FIG. 1, the client system 10 is in a networked environment with logical connections to one or more remote computers 12*a–b,* any machine on the Internet 22, and administration system 14. The logical connections between the client system 10, remote computers 12*a–b,* any machine on the Internet 22, and administration system 14 are represented by local area networks 18*a–b,* such as Ethernet, Token Ring, or ARCnet, and a wide area network 30, such as one created by routers 24*a–c.* It is important to note the wide area network 30 could be composed of a varying number of routers and that local area networks 18*a–b* could contain a varying number of systems. Further, administration system 14 could be any machine connected to the network, but for the purposes of simplifying the illustration it is specified as a particular machine.

Figure 2:
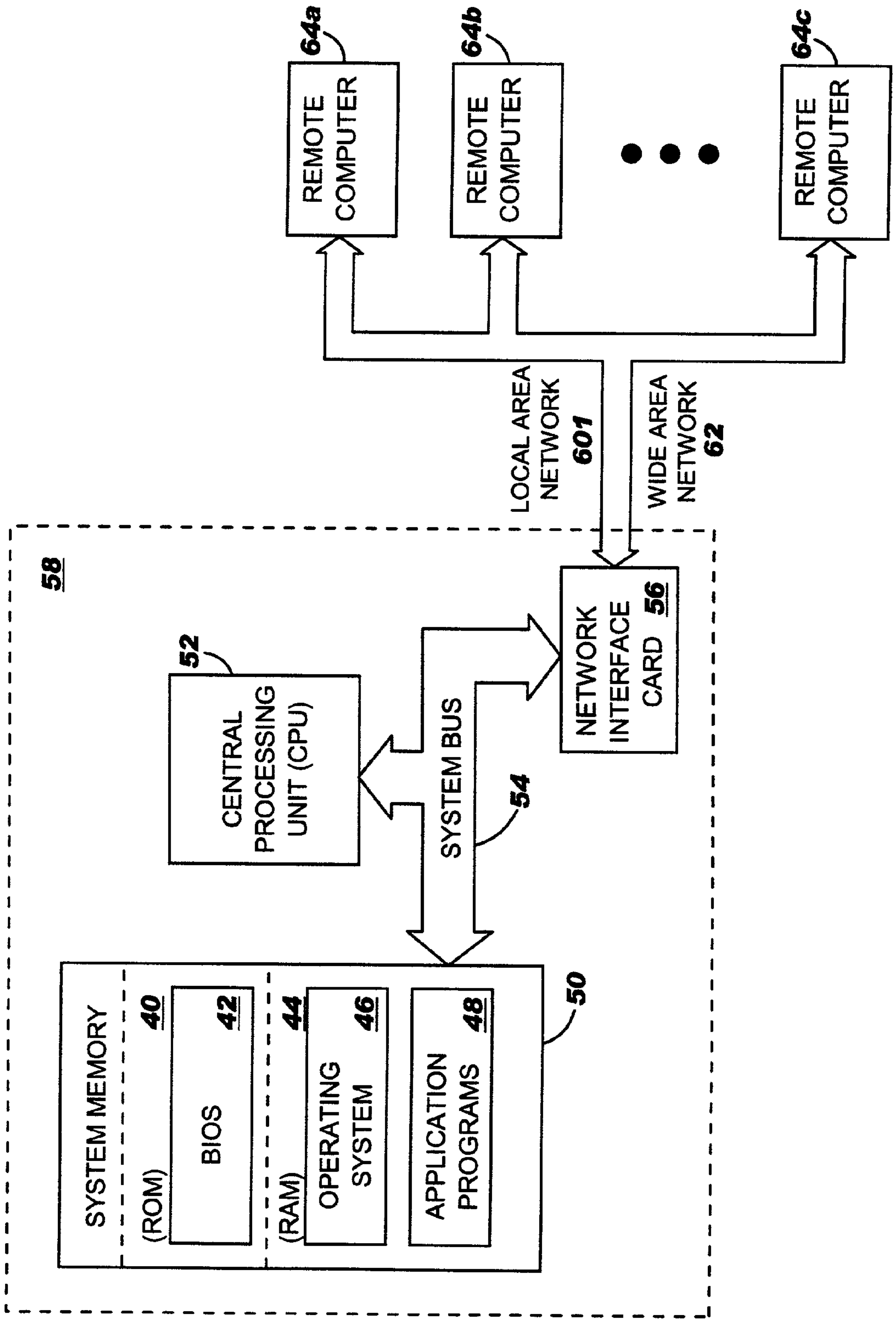
FIG. 2 is a block diagram of the operating environment of a computer within the network of FIG. 1, in accordance with of the preferred embodiment.

Referring to FIG. 1 and FIG. 2, the client system 10, as well as the remote computers 12*a–b* and administration system 14, also includes at least one network interface card 56 for connecting the hardware of the computers to the local area network 18*a–b* and/or wide area network 30. The CPU 52 operates to execute an operating system 46 and application programs 48 desired by an operator of the system. The operating system 46 and application programs 48 can be stored within RAM 44. BIOS 42 resides in read-only memory (ROM) 40 and is responsible for basic input and output. To simplify the representation of a general purpose computer system, conventional computer components, including computer resources such as direct memory access controller, interrupt controller, and I/O controllers, are not shown. However, it will be appreciated that CPU 52 is connected to conventional computer components via one or more system busses 54 that support communications of control, address, and data signals between the CPU 52 and these standard computer components. Remote computers 64*a–c* represent machines logically connected to client system 58 and includes administration system 14 as well as other computer systems connected to the network depicted in FIG. 1.

In one preferred embodiment of the present invention, a method and system of waking a remote computer from the network is provided. For example, in the diagram shown in FIG. 1, a method and system are provided whereby the administration system 14 may wake the client system 10 via the local area network 18*a–b* or wide area network 30. Conversely, the client system 10 may act as an administration system and utilize the methods and systems described herein to wake any of the remote computers 12*a–b*.

Figure 3:
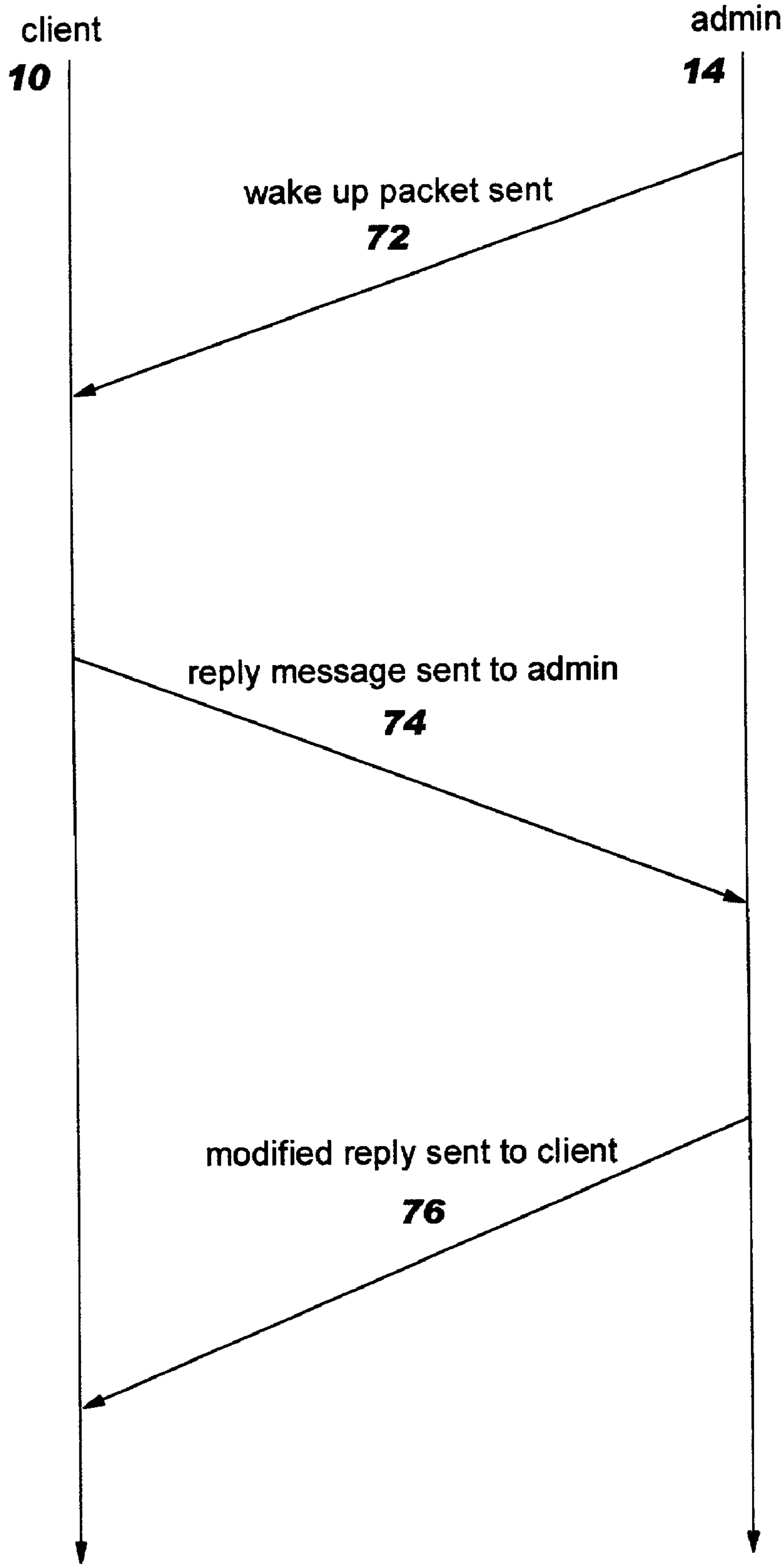
FIG. 3 is a state diagram depicting one preferred set of steps for remotely awakening a computer by another computer on the network.

Referring to FIG. 1, FIG. 2, and FIG. 3, network interface card 56 in client machine 10 detects the magic packet transmitted from administration system 14 as depicted at step 72. In response, client system 10 sends a reply to administration system 14 as illustrated at step 74 for authentication. Once administration system 14 receives the reply, the reply is modified in a predetermined manner and transmitted to client machine 10 as depicted at step 76. Client system 10 verifies the modified packet from administration system 14 was modified in the predetermined manner, and if the modified packet is verified client system 10 awakens. Otherwise, client system 10 continues to sleep.

The manner of initially communicating to or from a client system the manner a reply packet is to be modified may be any method known in the art. For example, a secure transmission or predetermined sequence may be utilized.

Those skilled in the art will appreciate that the predetermined method of modifying the packet may be by any number of methods known in the art and that the authentication could be performed by a system other than the administration system that sent the original magic packet. Further, those skilled in the art realize the magic packet could be substituted with a packet of different form that performs the same function of provoking the client system to transmit a reply to the administration system for authentication.

The present invention has been described in relation to particular embodiments which are intended in all respects to be illustrative rather than restrictive. Alternative embodiments will become apparent to those skilled in the art to which the present invention pertains without departing from its spirit and scope. For example, although the present invention has been described in accordance with a remote computer in a power down mode, it will be appreciated that the systems and principles described herein may also be useful in a computer that is operating in full power mode by having the network interface card send an interrupt only when it receives a packet that the computer needs to process. Moreover, the present invention has been described in accordance with waking a personal computer. However, the design described herein equally applies to any other computers, servers, network peripherals or network servers. Accordingly, the scope of the present invention is defined by the appended claims rather than the foregoing discussion.

What is claimed is:

1. A method for remotely waking up a client system within a network having a plurality of systems which includes an administration system, comprising the steps of:

detecting a transmitted packet of data which includes a data sequence within said network;

determining if said data sequence matches a particular data sequence associated with said client system;

transmitting a response packet from said client system to said administration system in response to said determination;

modifying said response packet at said administration system in a selected manner;

transmitting said modified response packet from said administration system to said client system;

verifying at said client system that said modified response packet was modified in said selected manner; and waking said client system only in response to determining that said data sequence within said transmitted packet of data matches said particular data sequence associated with said client system and that said modified response packet was modified in said selected manner wherein the likelihood of an unauthorized remotely initiated wake up is diminished.

2. The method as described by claim 1 wherein said particular data sequence is said client system's address repeated sixteen times.

3. The method as described by claim 1 wherein said step of determining if said data sequence matches said particular sequence associated with said client system is performed by a network adapter.

4. The method as described by claim 1 wherein said step of verifying at said client system that said modified response packet was modified in said selected manner is performed by a network adapter within said client system.

5. A system for remotely waking up a client system within a network having a plurality of systems which includes an administration system, comprising:

means for detecting a transmitted packet of data which includes a data sequence within said network;

means for determining if said data sequence matches a particular data sequence associated with said client system;

means for transmitting a response packet from said client system to said administration system in response to said determination;

means for modifying said response packet at said administration system in a selected manner;

means for transmitting said modified response packet from said administration system to said client system;

means for verifying at said client system that said modified response packet was modified in said selected manner; and means for waking said client system only in response to determining that said data sequence within said transmitted packet of data matches said particular data sequence associated with said client system and that said modified response packet was modified in said selected manner wherein the likelihood of an unauthorized remotely initiated wake up is diminished.

6. The system as described by claim 5 wherein said particular data sequence is said client system's address repeated sixteen times.

7. The system as described by claim 5 wherein said means for determining if said data sequence matches said particular sequence associated with said client system is a network adapter.

8. The system as described by claim 5 wherein said means for verifying at said client system that said modified response packet was modified in said selected manner is a network adapter within said client system.

* * * * *